US012686905B2

(12) United States Patent
Mizutani et al.

(10) Patent No.: US 12,686,905 B2
(45) Date of Patent: Jul. 21, 2026

(54) STAINLESS STEEL FOIL FOR CATALYST SUPPORT OF EXHAUST GAS PURIFIER

(71) Applicant: JFE STEEL CORPORATION, Tokyo (JP)

(72) Inventors: Akito Mizutani, Tokyo (JP); Takayoshi Yano, Tokyo (JP); Kazuhiko Ikeda, Ashigarakami-gun (JP); Tomoko Fujii, Ashigarakami-gun (JP); Hiroshi Matsunaga, Ashigarakami-gun (JP)

(73) Assignee: JFE STEEL CORPORATION, Tokyo (JP)

( * ) Notice: Subject to any disclaimer, the term of this patent is extended or adjusted under 35 U.S.C. 154(b) by 492 days.

(21) Appl. No.: 18/255,586

(22) PCT Filed: Dec. 13, 2021

(86) PCT No.: PCT/JP2021/045802
§ 371 (c)(1),
(2) Date: Jun. 2, 2023

(87) PCT Pub. No.: WO2022/131203
PCT Pub. Date: Jun. 23, 2022

(65) Prior Publication Data
US 2024/0011136 A1    Jan. 11, 2024

(30) Foreign Application Priority Data

Dec. 15, 2020    (JP) ................................. 2020-207211

(51) Int. Cl.
*C22C 38/54* (2006.01)
*B01J 23/745* (2006.01)
(Continued)

(52) U.S. Cl.
CPC ............. *C22C 38/54* (2013.01); *B01J 23/745* (2013.01); *C22C 38/001* (2013.01);
(Continued)

(58) Field of Classification Search
None
See application file for complete search history.

(56) References Cited

U.S. PATENT DOCUMENTS

2001/0032687 A1    10/2001   Antoni et al.

FOREIGN PATENT DOCUMENTS

EP          1580288 A1     9/2005
JP      2001032051 A      2/2001
(Continued)

OTHER PUBLICATIONS

English language machine translation of JP-2011063833-A. Generated Sep. 6, 2025. (Year: 2025).*
(Continued)

*Primary Examiner* — Brian D Walck
(74) *Attorney, Agent, or Firm* — KENJA IP LAW PC

(57) ABSTRACT

Provided is a stainless steel foil for a catalyst support of an exhaust gas purifier excellent in both diffusion bonding resistance and brazeability and also excellent in oxidation resistance at high temperatures. The stainless steel foil for a catalyst support of an exhaust gas purifier comprises: a predetermined chemical composition; a parameter Sa defined in ISO 25178 of 0.50 μm to 3.00 μm; and a parameter Str defined in ISO 25178 of 0.20 to 1.00.

9 Claims, 3 Drawing Sheets

(51) Int. Cl.

| | |
|---|---|
| *C22C 38/00* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/50* | (2006.01) |

(52) U.S. Cl.
CPC .......... *C22C 38/002* (2013.01); *C22C 38/005* (2013.01); *C22C 38/008* (2013.01); *C22C 38/04* (2013.01); *C22C 38/06* (2013.01); *C22C 38/42* (2013.01); *C22C 38/44* (2013.01); *C22C 38/46* (2013.01); *C22C 38/50* (2013.01)

(56) References Cited

FOREIGN PATENT DOCUMENTS

| | | | |
|---|---|---|---|
| JP | 2002080944 A | | 3/2002 |
| JP | 2009046718 A | | 3/2009 |
| JP | 2009165979 A | | 7/2009 |
| JP | 2011063833 A | * | 3/2011 |
| JP | 4941320 B2 | | 5/2012 |
| JP | 5504778 B2 | | 5/2014 |
| JP | 2014083550 A | | 5/2014 |

OTHER PUBLICATIONS

Feb. 22, 2022, International Search Report issued in the International Patent Application No. PCT/JP2021/045802.

Dehe Chen, Defects in Steel, Aug. 1977, p. 420, Machinery Industry Press.

Feb. 27, 2025, Office Action issued by the China National Intellectual Property Administration in the corresponding Chinese Patent Application No. 202180083547.0 with English language Concise Statement of Relevance.

J.R. Davis et al., Metals Handbook Desk Edition (Second Edition), Jan. 2011, pp. 659-661, Machinery Industry Press.

Jul. 1, 2025, the Extended European Search Report issued by the European Patent Office in the corresponding European Patent Application No. 21906565.3.

* cited by examiner

STAINLESS STEEL FOIL FOR CATALYST SUPPORT OF EXHAUST GAS PURIFIER

TECHNICAL FIELD

The present disclosure relates to a stainless steel foil, and particularly to a stainless steel foil used for a catalyst support of an exhaust gas purifier.

BACKGROUND

Stainless steel containing a large amount of Al (for example, containing about 5 mass % of Al) (hereinafter also referred to as "Al-containing stainless steel") has excellent oxidation resistance at high temperatures. Hence, Al-containing stainless steel is worked into foil material and used as catalyst supports (hereinafter also referred to as "metal honeycombs") of exhaust gas purifiers for automobiles, motorcycles, marine motorcycles, motorboats, large lawnmowers, small generators, etc.

FIG. 1 is a schematic sectional view of a typical metal honeycomb. As illustrated in FIG. 1, the metal honeycomb has a honeycomb structure in which a flat stainless steel foil (flat foil 1) and a corrugated stainless steel foil (corrugated foil 2) are alternately stacked. The foils are fixed to each other by brazing or the like. A catalyst substance is applied to the surface of such stainless steel foil, and the resultant metal honeycomb is used for an exhaust gas purifier.

The exhaust gas temperature of automobiles and the like changes frequently due to changes in engine output and repeated starting and stopping of the engine. This also causes the temperature of the metal honeycomb to repeatedly rise and fall. When the temperature of the metal honeycomb changes, the stainless steel foil used in the metal honeycomb repeatedly expands and contracts, as a result of which thermal stress occurs inside the metal honeycomb.

To alleviate such thermal stress, brazing treatment during metal honeycomb production is performed by, instead of applying brazing material to all contact points between the flat foil and the corrugated foil, applying brazing material to only some of the contact points to fix the flat foil and the corrugated foil to each other.

Brazing treatment is typically performed at a high temperature of about 1150° C. in a non-oxidizing atmosphere such as a nitrogen atmosphere or a vacuum. There is thus a possibility that the stainless steel foils are diffusion-bonded even at the contact points between the flat foil and the corrugated foil to which the brazing material is not applied. If such unintended diffusion bonding occurs, the thermal stress cannot be alleviated and the durability of the metal honeycomb decreases.

Stainless steel foils used for metal honeycombs are therefore required to have improved diffusion bonding resistance in order to prevent such unintended diffusion bonding.

As a technique for improving diffusion bonding resistance, for example, JP 2001-32051 A (PTL 1) discloses "An Al-containing ferritic stainless steel sheet excellent in diffusion bonding resistance, comprising, in a surface layer, a region satisfying a condition of N %/(Fe %+Cr %+Al+O %+N %)≥0.10 in atomic % ratio".

JP 5504778 B2 (PTL 2) discloses "A diffusion bonding-resistant stainless steel foil comprising: a composition containing, in mass %, C: 0.05% or less, Si: 2.0% or less, Mn: 1.0% or less, Cr: 13.0% to 30.0%, Al: 3.0% to 10.0%, N: 0.10% or less, Ti: 0.02% or less, Zr: 0.005% to 0.20%, REM: 0.03% to 0.20%, Ca: 0.0010% to 0.0300%, and Mg: 0.0015% to 0.0300% with the balance consisting of Fe and inevitable impurities; an oxide coating having a coating thickness of 30 nm to 200 nm on a surface thereof, wherein a coating thickness of $Al_2O_3$ is 50% or more of a total coating thickness; and a surface roughness Ra of 0.5 μm to 1.5 μm".

JP 4941320 B2 (PTL 3) discloses "A catalyst support of an exhaust gas purifier, comprising: a honeycomb structure in which a flat foil and a corrugated foil of Fe—Cr—Al alloy foil are alternately wound in a cylindrical shape, wherein, at a contact surface between the flat foil and the corrugated foil, average roughness Ra (1) measured in a winding direction of one of the foils is 0.10 μm to 0.50 μm, and average roughness Ra (2) measured in a winding direction of the other one of the foils is 0.30 μm to 0.80 μm greater than Ra (1)".

CITATION LIST

Patent Literature

PTL 1: JP 2001-32051 A
PTL 2: JP 5504778 B2
PTL 3: JP 4941320 B2

SUMMARY

Technical Problem

The techniques in PTL 1 and PTL 2 are intended to prevent diffusion bonding by a coating (hereafter also referred to as "surface coating") of nitride, oxide, or the like that is formed on the surface of the stainless steel foil by heat treatment under predetermined conditions. However, the presence of such a surface coating on the surface of the stainless steel foil may decrease the brazeability and cause a bonding failure at the contact points between the flat foil and the corrugated foil to which the brazing material is applied.

The technique in PTL 3 cannot necessarily achieve sufficient diffusion bonding resistance, and further improvement in diffusion bonding resistance is needed.

It could therefore be helpful to provide a stainless steel foil that is excellent in both diffusion bonding resistance and brazeability and also excellent in oxidation resistance at high temperatures.

Solution to Problem

Upon careful examination, we discovered that it is effective to provide the surface of the stainless steel foil with irregularities (i.e. projections and recesses), increase the height of the irregularities, and isotropically shape the irregularities. Studies leading to this discovery will be described below.

(1) First, we observed the surface state of the Fe—Cr—Al alloy foil disclosed in PTL 3, in order to investigate the reason why sufficient diffusion bonding resistance cannot be achieved by the technique in PTL 3. We consequently found out that streaky irregularities extending in one direction (rolling direction) as illustrated in FIG. 2 are formed on the entire surface of the Fe—Cr—Al alloy foil disclosed in PTL 3, which makes it impossible to achieve sufficient diffusion bonding resistance.

(FIG. 2 is a photograph of the surface state, observed with a laser microscope, of a Fe—Cr—Al alloy foil obtained by cold rolling, to a thickness of 50 μm, a Fe—Cr—Al alloy containing, in mass %, C: 0.005%, Si: 0.15%, Mn: 0.12%, P: 0.03%, S: 0.001%, Cr: 20.3%, Al: 5.8%, N: 0.006%, Zr: 0.03%, and La: 0.08% with the balance consisting of Fe and inevitable impurities. Sa of the Fe—Cr—Al alloy foil is 0.23 μm, and Str of the Fe—Cr—Al alloy foil is 0.04. The definitions and measurement methods of Sa and Str will be described later.)

(2) We consider the reason for this as follows.

The technique in PTL 3 increases the surface roughness of the Fe—Cr—Al alloy foil and makes the flat foil and the corrugated foil, which are in contact with each other, different in surface roughness, in order to reduce the contact area at the contact points between the flat foil and the corrugated foil and prevent diffusion bonding. This technique uses high-roughness work rolls in cold rolling to adjust the surface roughness of each foil. During this, streaky irregularities extending in the rolling direction form on the foil. As foil materials used for metal honeycombs, both the corrugated foil and the flat foil need to have a length of about several tens of meters. Hence, the longitudinal direction of each of the corrugated foil and the flat foil is parallel to the rolling direction of the cold-rolled coil. When such corrugated foil and flat foil are used to produce a metal honeycomb, the directions of the streaky irregularities on the corrugated foil and on the flat foil are aligned at the contact points between the corrugated foil and the flat foil. Moreover, the streaky irregularities on the corrugated foil and on the flat foil are roughly at regular intervals. Accordingly, when the foil materials having the streaky irregularities on their surfaces are brought into contact with each other, the streaky projected parts come into contact with each other or the streaky projected parts and recessed parts engage with each other, as a result of which the contact area at the contact points between the flat foil and the corrugated foil increases. Consequently, the technique in PTL 3 cannot achieve sufficient diffusion bonding resistance.

(3) Based on these findings, we attempted to improve the diffusion bonding resistance by increasing the height of the irregularities. However, simply increasing the height of the irregularities cannot completely eliminate the contact between the streaky projected parts and the engagement between the streaky projected parts and recessed parts, and cannot achieve sufficient diffusion bonding resistance improving effect.

(4) In view of this, we conducted further study, and discovered that, by increasing the height of the irregularities on the surface of the stainless steel foil and making the shape of the irregularities isotropic, specifically, by setting the parameter Sa defined in ISO 25178 to 0.50 μm to 3.00 μm and setting the parameter Str defined in ISO 25178 to 0.20 to 1.00, the diffusion bonding resistance can be considerably improved while ensuring excellent brazeability. The parameter Sa defined in ISO 25178 is a type of surface roughness parameter, and represents the arithmetical mean height. The arithmetical mean height is the mean of the absolute value of the difference in height of each point from the mean plane of the surface, and is a parameter commonly used when evaluating the surface roughness. The parameter Str defined in ISO 25178 is a type of surface roughness parameter, and represents the texture aspect ratio of the surface. The texture aspect ratio of the surface indicates the isotropy or anisotropy of the surface texture, and takes a value of 0 to 1.00. When the texture aspect ratio of the surface is closer to 0, the anisotropy of the surface texture is stronger and there are more streaks (streaky irregularities) extending in one direction. When the texture aspect ratio of the surface is closer to 1, the isotropy of the surface texture is stronger and the surface texture is less direction-dependent (i.e. there are fewer streaky irregularities).

(For reference, FIG. 3 is a photograph of the surface state of a stainless steel foil according to one embodiment of the present disclosure, observed with a laser microscope. This stainless steel foil has Sa of 2.0 μm and Str of 0.65.)

(5) We also studied how to produce a stainless steel foil having the foregoing surface texture, and discovered that it is important to subject a stainless steel foil having a predetermined chemical composition to surface treatment under predetermined conditions. Specifically, it is important to: perform, as first immersion treatment, immersion treatment with a treatment temperature of 20° C. to 60° C. and a treatment time of 30 seconds to 120 seconds using an aqueous solution containing hydrogen peroxide, copper ion, and halide ion as a treatment solution; and, after the first immersion treatment, perform, as second immersion treatment, immersion treatment with a treatment temperature of 30° C. to 60° C. and a treatment time of 5 seconds to 120 seconds using an acidic aqueous solution containing hydrogen peroxide or an aqueous solution containing nitric acid as a treatment solution.

(6) Furthermore, we investigated the influence of the average grain size of the stainless steel foil on the dissolution behavior during the first immersion treatment, and discovered that the average grain size of the stainless steel foil is preferably 15 μm or more and 25 μm or less.

The present disclosure is based on these discoveries and further studies.

We thus provide:

1. A stainless steel foil for a catalyst support of an exhaust gas purifier, comprising: a chemical composition containing (consisting of), in mass %, C: 0.020% or less, Si: 1.0% or less, Mn: 1.0% or less, P: 0.040% or less, S: 0.004% or less, Cr: 16.0% to 30.0%, Al: 2.00 to 6.50%, N: 0.020% or less, Ni: 0.50% or less, and at least one selected from the group consisting of Ti: 0.30% or less, Zr: 0.20% or less, Hf: 0.20% or less, and REM: 0.20% or less, with a balance consisting of Fe and inevitable impurities; a parameter Sa defined in ISO 25178 of 0.50 μm to 3.00 μm; and a parameter Str defined in ISO 25178 of 0.20 to 1.00.

2. The stainless steel foil for a catalyst support of an exhaust gas purifier according to 1., wherein the chemical composition further contains, in mass %, at least one selected from the group consisting of Cu: 0.10% or less, Nb: 0.30% or less, V: 0.30% or less, Ca: 0.0100% or less, Mg: 0.0100% or less, and B: 0.0050% or less.

3. The stainless steel foil for a catalyst support of an exhaust gas purifier according to 1. or 2., wherein the chemical composition further contains at least one selected from the group consisting of Mo and W, and a total content of Mo and W is 6.0 mass % or less.

4. The stainless steel foil for a catalyst support of an exhaust gas purifier according to any one of 1. to 3., comprising an average grain size of 15 μm or more and 25 μm or less.

Advantageous Effect

It is thus possible to obtain a stainless steel foil that is excellent in both diffusion bonding resistance and brazeability and also excellent in oxidation resistance at high temperatures. Such a stainless steel foil is suitable for use not only in catalyst supports of exhaust gas purifiers for automobiles, motorcycles, marine motorcycles, snowmobiles, ships, etc. but also in other combustion gas exhaust system members.

DETAILED DESCRIPTION

Figure 1:
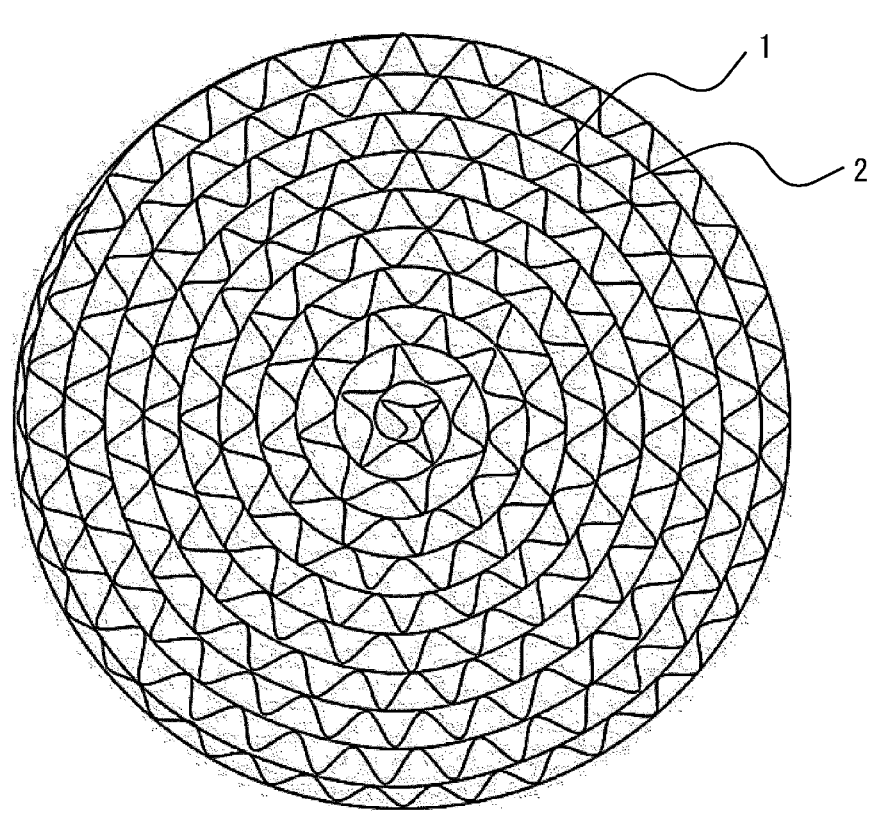
FIG. 1 is a schematic sectional view of a typical metal honeycomb.
Figure 2:
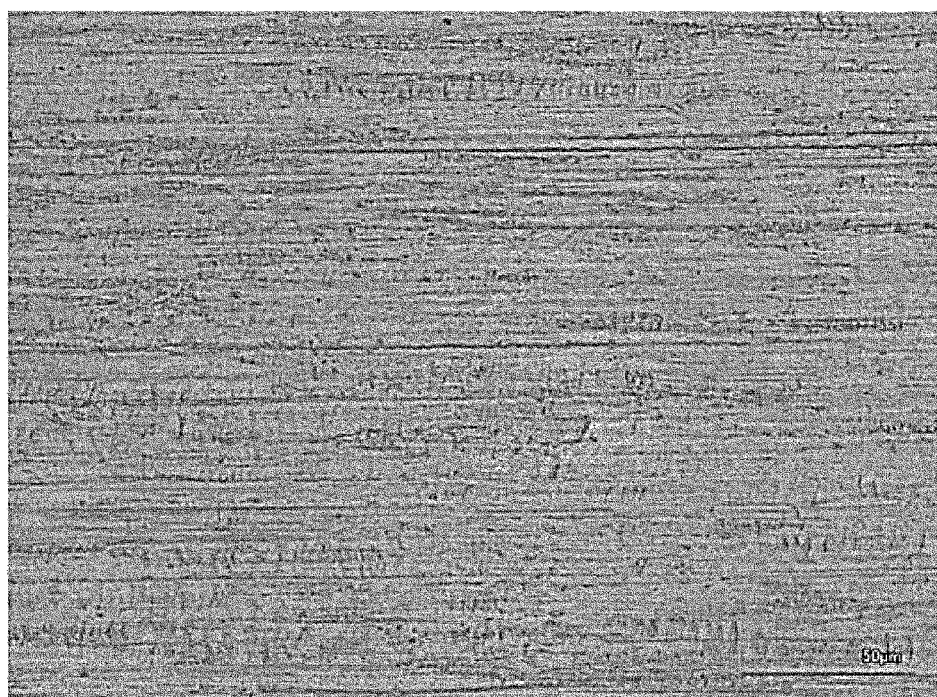
FIG. 2 is a photograph of the surface state of a Fe—Cr— Al alloy foil according to a conventional technique, observed with a laser microscope.
Figure 3:
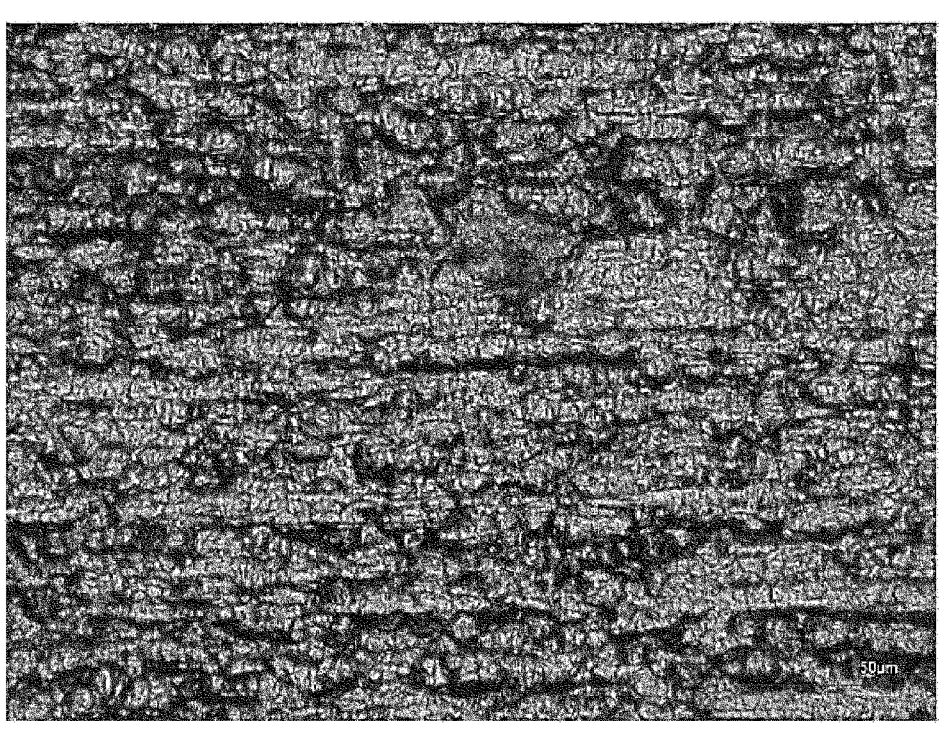
FIG. 3 is a photograph of the surface state of a stainless steel foil according to one embodiment of the present disclosure, observed with a laser microscope.

Embodiment of the present disclosure will be described below.

First, the chemical composition of a stainless steel foil according to one embodiment of the present disclosure will be described below. While the unit of the content of each element in the chemical composition is "mass %", the content is expressed simply in "%" unless otherwise specified.

C: 0.020% or Less

If the C content is more than 0.020%, the toughness of a hot-rolled steel sheet or cold-rolled steel sheet as an intermediate production material of the stainless steel foil (hereafter also simply referred to as a hot-rolled steel sheet or cold-rolled steel sheet) decreases, making the production of the stainless steel foil difficult. The C content is therefore 0.020% or less. The C content is preferably 0.015% or less, and more preferably 0.010% or less. Excessively reducing C causes an increase in refining time, and makes the production difficult. Accordingly, the C content is preferably 0.002% or more.

Si: 1.0% or Less

If the Si content is more than 1.0%, the toughness of the hot-rolled steel sheet or cold-rolled steel sheet decreases, making the production of the stainless steel foil difficult. The Si content is therefore 1.0% or less. The Si content is preferably 0.5% or less, and more preferably 0.2% or less. If the Si content is less than 0.01%, refining is difficult. Accordingly, the Si content is preferably 0.01% or more.

Mn: 1.0% or Less

If the Mn content is more than 1.0%, the oxidation resistance of the stainless steel foil is lost. The Mn content is therefore 1.0% or less. The Mn content is preferably 0.5% or less, and more preferably 0.15% or less. If the Mn content is less than 0.01%, refining is difficult. Accordingly, the Mn content is preferably 0.01% or more.

P: 0.040% or Less

If the P content is more than 0.040%, the toughness and ductility of the hot-rolled steel sheet or cold-rolled steel sheet decrease, making the production of the stainless steel foil difficult. The P content is therefore 0.040% or less. The P content is preferably 0.030% or less. It is desirable to reduce the P content as much as possible, and the P content may be 0%.

S: 0.004% or Less

If the S content is more than 0.004%, the hot workability decreases, making the production of the hot-rolled steel sheet difficult. This makes the production of the stainless steel foil difficult. The S content is therefore 0.004% or less. The S content is preferably 0.003% or less, and more preferably 0.002% or less. It is desirable to reduce the S content as much as possible, and the S content may be 0%.

Cr: 16.0% to 30.0%

Cr is an element essential to ensure the oxidation resistance at high temperature. If the Cr content is less than 16.0%, sufficient oxidation resistance at high temperature cannot be ensured. If the Cr content is more than 30.0%, the toughness of a slab or hot-rolled steel sheet as an intermediate production material of the stainless steel foil decreases, making the production of the stainless steel foil difficult. The Cr content is therefore 16.0% to 30.0%. The Cr content is preferably 17.0% or more. The Cr content is preferably 26.0% or less, and more preferably 22.0% or less.

Al: 2.00% to 6.50%

Al is an element that forms an oxide coating mainly composed of $Al_2O_3$ at high temperatures to significantly improve the oxidation resistance. This effect is achieved when the Al content is 2.00% or more. If the Al content is more than 6.50%, the toughness of the steel decreases, making the production of the stainless steel foil difficult. The Al content is therefore 2.00% to 6.50%. The Al content is preferably 3.00% or more, and more preferably 4.50% or more. The Al content is preferably 6.00% or less.

N: 0.020% or Less

If the N content is more than 0.020%, the toughness of the hot-rolled steel sheet or cold-rolled steel sheet decreases, making the production of the stainless steel foil difficult. The N content is therefore 0.020% or less. The N content is preferably 0.010% or less. The N content may be 0%. Excessively reducing N, however, causes an increase in refining time, and makes the production difficult. Accordingly, the N content is preferably 0.002% or more.

Ni: 0.50% or Less

Ni is an austenite forming element. If the Ni content is more than 0.50%, oxidation at high temperature progresses, and austenite phase forms in the case where Al in the stainless steel foil is depleted by oxidation. Since austenite phase increases the thermal expansion coefficient of the stainless steel foil, problems such as a constriction and a fracture of the stainless steel foil occur. The Ni content is therefore 0.50% or less. The Ni content is preferably 0.20% or less. If the Ni content is less than 0.01%, refining is difficult. Accordingly, the Ni content is preferably 0.01% or more.

The chemical composition of the stainless steel foil according to one embodiment of the present disclosure further contains at least one selected from the group consisting of Ti: 0.30% or less, Zr: 0.20% or less, Hf: 0.20% or less, and REM: 0.20% or less. The total content of Ti, Zr, Hf, and REM is preferably 0.01% or more. The total content of Ti, Zr, Hf, and REM is preferably 0.30% or less. Ti, Zr, Hf, and REM may be contained singly or in combination.

Ti: 0.30% or Less

Ti has the effect of improving the adhesion of the $Al_2O_3$ oxide coating to improve the oxidation resistance, and the effect of fixing C and N and improving the toughness. These effects are achieved when the Ti content is 0.01% or more. If the Ti content is more than 0.30%, the growth rate of the $Al_2O_3$ oxide coating increases and the oxidation resistance decreases. The Ti content is therefore 0.30% or less. The Ti content is preferably 0.10% or less. The Ti content is preferably 0.01% or more, and more preferably 0.02% or more.

US 12,686,905 B2

7

Zr: 0.20% or Less

Zr has the effect of improving the adhesion of the Al$_2$O$_3$ oxide coating and also reducing the growth rate of the Al$_2$O$_3$ oxide coating to improve the oxidation resistance. Zr also has the effect of fixing C and N and improving the toughness. These effects are achieved when the Zr content is 0.01% or more. If the Zr content is more than 0.20%, an intermetallic compound forms and the toughness of the hot-rolled steel sheet or cold-rolled steel sheet decreases. This makes the production of the stainless steel foil difficult. The Zr content is therefore 0.20% or less. The Zr content is preferably 0.10% or less. The Zr content is preferably 0.01% or more, and more preferably 0.02% or more.

Hf: 0.20% or Less

Hf has the effect of improving the adhesion of the Al$_2$O$_3$ oxide coating and also reducing the growth rate of the Al$_2$O$_3$ oxide coating to improve the oxidation resistance. This effect is achieved when the Hf content is 0.01% or more. If the Hf content is more than 0.20%, an intermetallic compound forms and the toughness of the hot-rolled steel sheet or cold-rolled steel sheet decreases. This makes the production of the stainless steel foil difficult. The Hf content is therefore 0.20% or less. The Hf content is preferably 0.10% or less. The Hf content is preferably 0.01% or more, and more preferably 0.02% or more.

REM: 0.20% or Less

REM (rare earth metals) refers to Sc, Y, and lanthanoid-based elements (elements of atomic numbers 57 to 71 such as La, Ce, Pr, Nd, and Sm). REM has the effect of improving the adhesion of the Al$_2$O$_3$ oxide coating to improve the oxidation resistance. This effect is achieved when the REM content is 0.01% or more. If the REM content is more than 0.20%, the hot workability decreases, making the production of the stainless steel foil difficult. The REM content is therefore 0.20% or less. The REM content is preferably 0.10% or less. The REM content is preferably 0.01% or more, and more preferably 0.03% or more.

REM may be added using metal (misch metal, etc.) in which these elements are not separated and refined for cost reduction.

While the basic components have been described above, the chemical composition of the stainless steel foil according to one embodiment of the present disclosure may further contain at least one selected from the group consisting of Cu: 0.10% or less, Nb: 0.30% or less, V: 0.30% or less, Ca: 0.0100% or less, Mg: 0.0100% or less, and B: 0.0050% or less.

Cu: 0.10% or Less

Cu has the effect of precipitating into the steel and improving the high-temperature strength of the stainless steel foil. This effect is achieved when the Cu content is 0.01% or more. If the Cu content is more than 0.10%, the toughness of the hot-rolled steel sheet or cold-rolled steel sheet decreases, making the production of the stainless steel foil difficult. Accordingly, in the case of adding Cu, the Cu content is 0.10% or less. The Cu content is preferably 0.01% or more, and more preferably 0.02% or more.

Nb: 0.30% or Less

Nb has the effect of fixing C and N and improving the toughness of the hot-rolled steel sheet or cold-rolled steel sheet. This effect is achieved when the Nb content is 0.01% or more. If the Nb content is more than 0.30%, Nb oxide forms, and the oxidation resistance at high temperatures decreases. Accordingly, in the case of adding Nb, the Nb content is 0.30% or less. The Nb content is preferably 0.01% or more.

8

V: 0.30% or Less

V has the effect of fixing C and N and improving the toughness of the hot-rolled steel sheet or cold-rolled steel sheet. This effect is achieved when the V content is 0.01% or more. If the V content is more than 0.30%, V oxide forms, and the oxidation resistance at high temperatures decreases. Accordingly, in the case of adding V, the V content is 0.30% or less. The V content is preferably 0.10% or less. The V content is preferably 0.01% or more, and more preferably 0.02% or more.

Ca: 0.0100% or Less

Ca has the effect of improving the oxidation resistance. This effect is achieved when the Ca content is 0.0002% or more. If the Ca content is more than 0.0100%, the toughness of the hot-rolled steel sheet and cold-rolled steel sheet decreases, or the oxidation resistance of the stainless steel foil decreases. Accordingly, in the case of adding Ca, the Ca content is 0.0100% or less. The Ca content is preferably 0.0050% or less, and more preferably 0.0030% or less. The Ca content is preferably 0.0002% or more, and more preferably 0.0010% or more.

Mg: 0.0100% or Less

Mg has the effect of improving the oxidation resistance. This effect is achieved when the Mg content is 0.0002% or more. If the Mg content is more than 0.0100%, the toughness of the hot-rolled steel sheet and cold-rolled steel sheet decreases, or the oxidation resistance of the stainless steel foil decreases. Accordingly, in the case of adding Mg, the Mg content is 0.0100 or less. The Mg content is preferably 0.0050% or less, and more preferably 0.0030% or less. The Mg content is preferably 0.0002% or more, and more preferably 0.0010% or more.

B: 0.0050% or Less

B has the effect of segregating to crystal grain boundaries and improving the toughness of the hot-rolled steel sheet. This effect is achieved when the B content is 0.0002% or more. If the B content is more than 0.0050%, the steel hardens, causing a decrease in toughness. Accordingly, in the case of adding B, the B content is 0.0050% or less. The B content is preferably 0.0030% or less. The B content is preferably 0.0002% or more, and more preferably 0.0010% or more.

The chemical composition of the stainless steel foil according to one embodiment of the present disclosure may further contain at least one selected from the group consisting of Mo and W within the range where the total content of Mo and W is 6.0% or less.

Total Content of Mo and W: 6.0% or Less

Mo and W increase the high-temperature strength. Mo and W thus have the effect of, in the case where the stainless steel foil is used as a catalyst support, extending the life of the catalyst support. This effect is achieved when the total content of Mo and W is 0.5% or more. If the total content of Mo and W is more than 6.0%, the workability of the hot-rolled steel sheet or cold-rolled steel sheet decreases, making the production of the stainless steel foil difficult. Accordingly, in the case of adding Mo and/or W, the total content of Mo and W is 6.0% or less. The total content of Mo and W is preferably 4.5% or less. The total content of Mo and W is preferably 0.5% or more, and more preferably 2.5% or more. Here, at least one of Mo and W may be added. That is, either one or both of Mo and W may be added.

The balance other than the above-described components consists of Fe and inevitable impurities. Examples of the inevitable impurities include Co, Zn, and Sn. The content of each of these elements is preferably 0.3% or less.

The surface texture of the stainless steel foil according to one embodiment of the present disclosure will be described below.

In the stainless steel foil according to one embodiment of the present disclosure, it is important to increase the height of the irregularities on the surface and make the shape of the irregularities isotropic, specifically, set the parameter Sa defined in ISO 25178 to 0.50 μm to 3.00 μm and set the parameter Str defined in ISO 25178 to 0.20 to 1.00, as mentioned above. Thus, the diffusion bonding resistance can be considerably improved while ensuring excellent brazeability.

Parameter Sa Defined in ISO 25178: 0.50 μm to 3.00 μm

Sa is a type of surface roughness parameter defined in ISO 25178, and represents the arithmetical mean height. The arithmetical mean height is the mean of the absolute value of the difference in height of each point from the mean plane of the surface, and is a parameter commonly used when evaluating the surface roughness. If Sa is less than 0.50 μm, the height of the irregularities on the surface is insufficient. As a result, the contact area at the contact points between the flat foil and the corrugated foil cannot be reduced sufficiently, and excellent diffusion bonding resistance cannot be achieved. If Sa is more than 3.00 μm, the diffusion bonding resistance improving effect is saturated. Moreover, the stainless steel foil is excessively thin, which is not preferable. Sa is therefore in the range of 0.50 μm to 3.00 μm. Sa is preferably 0.80 μm or more, and more preferably 1.00 μm or more.

Parameter Str Defined in ISO 25178: 0.20 to 1.00

Str is a type of surface roughness parameter defined in ISO 25178, and represents the texture aspect ratio of the surface. The texture aspect ratio of the surface indicates the isotropy or anisotropy of the surface texture, and takes a value of 0 to 1.00. When the texture aspect ratio of the surface is closer to 0, the anisotropy of the surface texture is stronger and there are more streaks (streaky irregularities) extending in one direction. When the texture aspect ratio of the surface is closer to 1.00, the isotropy of the surface texture is stronger and the surface texture is less direction-dependent (i.e. there are fewer streaky irregularities). The streaky irregularities need to be reduced in order to improve the diffusion bonding resistance, as mentioned above. A Str value closer to 1.00, i.e. a more isotropic shape of the irregularities, is better. To achieve sufficient diffusion bonding resistance improving effect, Str needs to be 0.20 or more. If Str is less than 0.20, there are many streaky irregularities on the surface of the stainless steel foil, so that excellent diffusion bonding resistance cannot be achieved. Str is therefore in the range of 0.20 to 1.00. Str is preferably 0.40 or more, and more preferably 0.60 or more.

Sa and Str may be measured in accordance with ISO 25178. As a measurement device, for example, a laser microscope may be used. Each of Sa and Str is measured on both sides of the stainless steel foil at 5 points on each side, 10 points in total, and the average value of the obtained values is taken to be the corresponding one of Sa and St of the stainless steel foil.

In the stainless steel foil according to one embodiment of the present disclosure, the average grain size is preferably 15 μm or more and 25 μm or less.

Average Grain Size: 15 μm or More and 25 μm or Less

A stainless steel foil as rolled that has not been annealed has non-recrystallized uniform deformed microstructure. When such a stainless steel foil as rolled is subjected to the below-described first immersion treatment, dissolution progresses uniformly in the stainless steel foil. On the other hand, in a stainless steel foil obtained by subjecting a stainless steel foil as rolled to annealing (hereinafter also referred to as "annealed stainless steel foil"), the boundary of each recrystallized crystal grain (hereinafter also referred to as "crystal grain boundary") serves as the initiation point of dissolution. When such an annealed stainless steel foil is subjected to the below-described first immersion treatment, dissolution progresses nonuniformly in the stainless steel foil. In the case where the dissolution of the stainless steel foil progresses nonuniformly in the first immersion treatment, irregularities are likely to occur on the surface of the stainless steel foil from a stage where the dissolution amount is smaller than in the case where the dissolution progresses uniformly.

Our examination based on the foregoing findings revealed that, by appropriately controlling the size of the crystal grains of the stainless steel foil, specifically, by controlling the average grain size to the range of 15 μm or more and 25 μm or less, the desired surface texture (Sa and Str) of the stainless steel foil can be obtained with a smaller dissolution amount. Reduction in dissolution amount has many advantages such reduction in treatment time (immersion time) in the first immersion treatment, decrease in treatment temperature, reduction in the amount of the treatment solution used, reduction in the treatment cost of the used treatment solution, and improvement in product yield rate.

If the average grain size is 15 μm or more, a sufficient amount of defects accumulates at the crystal grain boundaries, and the difference in dissolution characteristics between the crystal grain boundaries and the inside of the crystal grains increases, so that the effect of reducing the dissolution amount is suitably achieved. If the average grain size is more than 25 μm, the amount of crystal grain boundaries per unit area decreases, and the effect of reducing the dissolution amount decreases. The average grain size of the stainless steel foil is therefore preferably 15 μm or more and 25 μm or less.

The average grain size of the stainless steel foil is determined by electron backscatter diffraction (EBSD) analysis.

In detail, the stainless steel foil is embedded in resin and the surface is polished so that a section parallel to the rolling direction of the stainless steel foil will be exposed. Following this, EBSD analysis is performed to calculate the average grain size based on the area fraction method. It is desirable that the observation field area when performing EBSD analysis is 0.025 mm$^2$ or more. For example, in the case of a stainless steel foil of 0.05 mm in thickness, the width of the observation field is desirably 0.5 mm or more. The other conditions may be in accordance with conventional methods. The grain size of each crystal grain is obtained by calculating the equivalent circle diameter from the area of each crystal grain obtained by the area fraction method.

The thickness of the stainless steel foil according to one embodiment of the present disclosure is 200 μm or less. In the case of using the stainless steel foil as a catalyst support of an exhaust gas purifier, it is advantageous that the stainless steel foil is thin from the viewpoint of decreasing the exhaust resistance. Hence, no lower limit is placed on the thickness of the stainless steel foil according to one embodiment of the present disclosure. Catalyst supports of exhaust gas purifiers are used in harsher environments than general use, and problems such as the stainless steel foil being cut or broken may occur. Therefore, the thickness of the stainless steel foil according to one embodiment of the present disclosure is preferably 20 μm or more. Catalyst supports of exhaust gas purifiers are required to have excellent vibration resistance and durability in some cases. In such cases, the thickness of the stainless steel foil is preferably 100 μm to 200 μm. Catalyst supports of exhaust gas purifiers are required to have high cell density and low back pressure in other cases. In such cases, the thickness of the stainless steel foil is preferably 20 μm to 100 μm.

A production method for the stainless steel foil according to one embodiment of the present disclosure will be described below.

First, a blank stainless steel foil having the foregoing chemical composition is prepared. For example, steel having the foregoing chemical composition is obtained by steel-making using a converter or an electric furnace, refined by VOD, AOD, or the like, and then subjected to blooming or continuous casting to obtain a slab. The slab is heated to a temperature of 1050° C. to 1250° C., and then hot rolled to obtain a hot-rolled steel sheet. The hot-rolled steel sheet may be subjected to hot-rolled sheet annealing. To remove scale, contaminants, etc. on the surface, the hot-rolled steel sheet may be subjected to polishing treatment using a grinder, sandblasting, steel grid blasting, alkali degreasing, pickling treatment, etc. The hot-rolled steel sheet is then cold rolled, optionally subjected to repeated annealing and cold rolling, and optionally subjected to final annealing. A blank stainless steel foil having a certain thickness can thus be obtained.

It is preferable to appropriately control the final annealing conditions, in particular the final annealing temperature and the final annealing time, from the viewpoint of controlling the average grain size of the stainless steel foil to the predetermined range. For example, it is preferable to control the final annealing temperature to the range of 850° C. to 950° C. and the final annealing time to the range of 20 seconds to 60 seconds. The atmosphere in the final annealing is preferably a non-oxidizing atmosphere (for example, a mixed atmosphere of $H_2$ and $N_2$ ($H_2$:$N_2$=75:25 in volume ratio, dew point: −50° C.)).

[First Immersion Treatment (Surface Treatment)]

The blank stainless steel foil obtained as described above is then subjected to surface treatment of immersing in a treatment solution that is an aqueous solution containing hydrogen peroxide: 0.1 mass % to 20 mass %, copper ion: 0.25 mass % to 40 mass %, and halide ion: 1.0 mass % to 30 mass % at a treatment temperature of 20° C. to 60° C. for a treatment time of 30 seconds to 120 seconds. Streaky irregularities extending in the rolling direction, which have been formed during rolling, are present on the surface of the blank stainless steel foil. As a result of performing the surface treatment under the foregoing conditions, such streaky irregularities can be eliminated, and the height of the irregularities on the surface of the stainless steel foil can be increased and also the shape of the irregularities can be made isotropic, specifically, it is possible to set the parameter Sa defined in ISO 25178 to 0.50 μm to 3.00 μm and the parameter Str defined in ISO 25178 to 0.20 to 1.00. The surface treatment conditions will be described below.

First, the function and suitable concentration of each component contained in the aqueous solution (treatment solution) will be described below.

Hydrogen Peroxide: 0.1 Mass % to 20 Mass %

The concentration of hydrogen peroxide contained in the aqueous solution is 0.1 mass % to 20 mass %. Hydrogen peroxide contained in the aqueous solution has the effect of promoting the surface treatment reaction, and also has the effect of facilitating the removal of smut (a mixture containing Cu as a main constituent element and C, N, S, O, Fe, Cr, Ni, etc.) formed by the surface treatment reaction. Accordingly, the concentration of hydrogen peroxide is preferably 0.1 mass % or more. The concentration of hydrogen peroxide is more preferably 0.2 mass % or more. If the concentration of hydrogen peroxide is more than 20 mass %, the effects are saturated. The concentration of hydrogen peroxide is therefore 20 mass % or less. The concentration of hydrogen peroxide is preferably 15 mass % or less, more preferably 10 mass % or less, and further preferably 8 mass % or less.

Copper Ion: 0.25 Mass % to 40 Mass %

The concentration of copper ion contained in the aqueous solution needs to be 0.25 mass % or more, in order to set the parameter Sa defined in ISO 25178 to 0.50 μm to 3.00 μm and the parameter Str defined in ISO 25178 to 0.20 to 1.00. If the concentration of copper ion is more than 40 mass %, the amount of smut that adheres to the steel sheet surface increases, and the smut cannot be sufficiently removed even by the subsequent second immersion treatment. The concentration of copper ion is therefore 0.25 mass % to 40 mass %. The concentration of copper ion is preferably 0.5 mass % or more, more preferably 1.0 mass % or more, and further preferably 1.5 mass % or more. The concentration of copper ion is preferably 30 mass % or less, more preferably 20 mass % or less, and further preferably 10 mass % or less.

Halide Ion: 1.0 Mass % to 30 Mass %

The concentration of halide ion contained in the aqueous solution needs to be 1.0 mass % or more, in order to set the parameter Sa defined in ISO 25178 to 0.50 μm to 3.00 μm and the parameter Str defined in ISO 25178 to 0.20 to 1.00. If the concentration of halide ion is more than 30 mass %, the effect is saturated. The concentration of halide ion is therefore 1.0 mass % to 30 mass %. The concentration of halide ion is preferably 5.0 mass % or more, and more preferably 10.0 mass % or more. The concentration of halide ion is preferably 25 mass % or less, more preferably 20 mass % or less, and further preferably 15 mass % or less. The type of halide ion source is not limited, but is, for example, preferably hydrogen halide or alkali metal halide, and more preferably hydrochloric acid or sodium chloride.

The aqueous solution can be prepared by stirring a hydrogen peroxide aqueous solution, a copper compound capable of supplying copper ions, a halide component capable of supplying halide ions, and water until they are mixed uniformly. The characteristics of the aqueous composition are not limited, but the pH value is preferably in the range of −1.0 to 4.0. The pH value is more preferably −0.5 or more, further preferably −0.25 or more, and even more preferably 0.0 or more. The pH value is more preferably 3.0 or less, further preferably 2.5 or less, and even more preferably 2.0 or less.

Treatment Temperature (Temperature of Treatment Solution): 20° C. to 60° C.

The treatment temperature is in the range of 20° C. to 60° C. If the treatment temperature is less than 20° C., the reaction rate is low, and the treatment efficiency decreases. If the treatment temperature is more than 60° C., the reaction rate is excessively high, which hinders surface shape control. The treatment temperature is therefore in the range of 20° C. to 60° C. The treatment temperature is preferably 25° C. or more, and more preferably 30° C. or more. The treatment temperature is preferably 55° C. or less, and more preferably 50° C. or less.

Treatment Time (Immersion Time): 30 Seconds to 120 Seconds

The treatment time is in the range of 30 seconds to 120 seconds. If the treatment time is less than 30 seconds, the effect is insufficient. If the treatment time is more than 120 seconds, the blank stainless steel foil dissolves excessively and the yield rate decreases. The treatment time is therefore in the range of 30 seconds to 120 seconds. The treatment time is preferably 40 seconds or more, and more preferably 50 seconds or more. The treatment time is preferably 100 seconds or less, and more preferably 90 seconds or less.

The conditions other than those described above are not limited, and may be in accordance with conventional methods. Although the above describes the surface treatment in which the blank stainless steel foil is immersed in the aqueous solution as the treatment solution, for example, the aqueous solution as the treatment solution may be dripped or sprayed as long as the blank stainless steel foil and the aqueous solution come into contact with each other. In such cases, the treatment time is the time of contact between the blank stainless steel foil and the aqueous solution.

[Second Immersion Treatment (Smut Removal Treatment)]

After the first immersion treatment, smut (a mixture containing Cu as a main constituent element and C, N, S, O, Fe, Cr, Ni, etc.) forms on the surface of the blank stainless steel foil. If such smut remains, the product appearance deteriorates and the catalyst support production line is contaminated. Hence, after the first immersion treatment, the second immersion treatment (smut removal treatment) is performed on the blank stainless steel foil to remove the smut.

In detail, after the first immersion treatment, the blank stainless steel foil is further subjected to the second immersion treatment that is:

(A) immersion treatment using an acidic aqueous solution containing hydrogen peroxide as a treatment solution, with a treatment temperature of 30° C. to 60° C. and an immersion time of 5 seconds to 120 seconds; or (B) immersion treatment using an aqueous solution containing nitric acid as a treatment solution, with a treatment temperature of 30° C. to 60° C. and an immersion time of 5 seconds to 120 seconds.

Herein, the acidic aqueous solution containing hydrogen peroxide is, for example, a mixed aqueous solution of hydrogen peroxide and sulfuric acid. The aqueous solution containing nitric acid is, for example, a nitric acid aqueous solution. In the case of using a mixed aqueous solution of hydrogen peroxide and sulfuric acid, it is preferable that the concentration of hydrogen peroxide is 0.1 mass % to 20 mass % and the concentration of sulfuric acid is 1.0 mass % to 20 mass %. In the case of using a nitric acid aqueous solution, the concentration of nitric acid is preferably 1.0 mass % to 40.0 mass %. Alcohol may be added to the treatment solution for the purpose of facilitating the removal of smut. Examples of the alcohol include methanol, ethanol, and n-propanol. The concentration of alcohol may be 0.1 mass % to 5.0 mass % with respect to the total amount of the treatment solution. The use of the aqueous solution containing nitric acid is more preferable because the effect of enhancing the corrosion resistance by passivating the surface of the stainless steel foil is achieved in addition to smut removal. The components other than hydrogen peroxide, sulfuric acid, and optional alcohol in the mixed aqueous solution of hydrogen peroxide and sulfuric acid and the components other than nitric acid and optional alcohol in the nitric acid aqueous solution are basically water.

The treatment temperature (temperature of treatment solution) in the second immersion treatment is preferably 30° C. to 60° C. in both (A) and (B) above.

A longer treatment time (immersion time) promotes more removal of smut and the like. If the treatment time is excessively long, however, the effect is saturated and also the productivity decreases. Accordingly, the treatment time is preferably 5 seconds to 120 seconds in both (A) and (B) above. The treatment time is more preferably 30 seconds or more. The treatment time is more preferably 90 seconds or less.

In the second immersion treatment, the surface of the stainless steel sheet of the material to be treated may be optionally scrubbed with a non-woven fabric wiper or the like, to facilitate smut removal. Although the above describes the treatment in which the blank stainless steel foil is immersed in the aqueous solution as the treatment solution, for example, the aqueous solution as the treatment solution may be dripped or sprayed as long as the blank stainless steel foil and the aqueous solution come into contact with each other. In such cases, the treatment time is the time of contact between the blank stainless steel foil and the aqueous solution.

The conditions other than those described above may be in accordance with conventional methods.

EXAMPLES

Example 1

Steels having the chemical compositions shown in Table 1 (the balance consisting of Fe and inevitable impurities) were each prepared by steelmaking using a 50 kg small vacuum melting furnace. The steels were each heated to 1200° C., and then subjected to hot rolling in the temperature range of 900° C. to 1200° C. to obtain a hot-rolled steel sheet with a thickness of 2.0 mm. The hot-rolled steel sheet was then subjected to annealing at 900° C. for 1 minute in air. After surface scale was removed with a grinder, the hot-rolled steel sheet was subjected to cold rolling to obtain a cold-rolled steel sheet with a thickness of 0.3 mm. The cold-rolled steel sheet was subjected to annealing at 900° C. for 20 seconds in a mixed atmosphere of $H_2$ and $N_2$ ($H_2:N_2$=75:25 in volume ratio, dew point: $-50°$ C.), and then further subjected to cold rolling to obtain a blank stainless steel foil with a thickness of 50 μm. Some blank stainless steel foils were each further subjected to, after the cold rolling, annealing (hereafter also referred to as "final annealing") at 900° C. for 20 seconds in a mixed atmosphere of $H_2$ and $N_2$ ($H_2:N_2$=75:25 in volume ratio, dew point: $-50°$ C.) (see Table 2 on whether the final annealing was performed).

Each blank stainless steel foil was then subjected to first immersion treatment (surface treatment) and second immersion treatment (smut removal treatment) under the conditions shown in Table 2, to obtain a stainless steel foil as a finished product. After the second immersion treatment, the stainless steel foil was immersed in pure water to stop the reaction. For comparison, steels with steel IDs A and B were used to produce stainless steel foils as finished products of three types, namely, "no surface treatment", "preliminary oxidation, no surface treatment", and "high-roughness roll rolling, no surface treatment".

Herein, "no surface treatment" refers to blank stainless steel foil not subjected to any surface treatment.

"Preliminary oxidation, no surface treatment" means that the blank stainless steel foil as rolled without final annealing was annealed at 950° C. for 30 seconds in a mixed atmosphere of $H_2$ and $N_2$ ($H_2:N_2$=75:25 in volume ratio, dew point: $-10°$ C.) to form a surface coating.

"High-roughness roll rolling, no surface treatment" means that, when performing cold rolling in the blank stainless steel foil production process, high-roughness work rolls with surface roughness Ra of 0.6 μm were used in the final rolling pass to enhance the surface roughness. In the production process for the other blank stainless steel foils, work rolls with surface roughness Ra of 0.1 μm were used in the final rolling pass.

For each stainless steel foil thus obtained, Sa and Str were measured in accordance with ISO 25178. A laser microscope (VK-X260 produced by Keyence Corporation) was used for the measurement. Specifically, a test piece having a width of 10 mm and a length of 15 mm was collected from the stainless steel foil, and surface shape data of a region with a width of 202 μm and a length of 270 μm was measured with the laser microscope using an objective lens with 50 magnifications. The obtained data were analyzed using analysis software "Multi-Analysis Application" attached to the device, and Sa and Str were obtained. The filter settings were: filter type: Gaussian, S-filter: none, F-operation: none, L-filter: none. The same measurement was performed on both sides of the stainless steel foil at 5 points on each side, 10 points in total, and the average value of the obtained values was taken to be the corresponding one of Sa and St of the stainless steel foil. The measurement results are shown in Table 3. The chemical composition of each stainless steel foil finally obtained was substantially the same as the chemical composition of the steel ID listed in Table 1, and satisfied the range of the chemical composition of the stainless steel foil according to one embodiment of the present disclosure.

Moreover, for each stainless steel foil, (1) diffusion bonding resistance, (2) brazeability, and (3) oxidation resistance were evaluated by the following methods. The evaluation results are shown in Table 3.

(1) Diffusion Bonding Resistance

Figure 4:
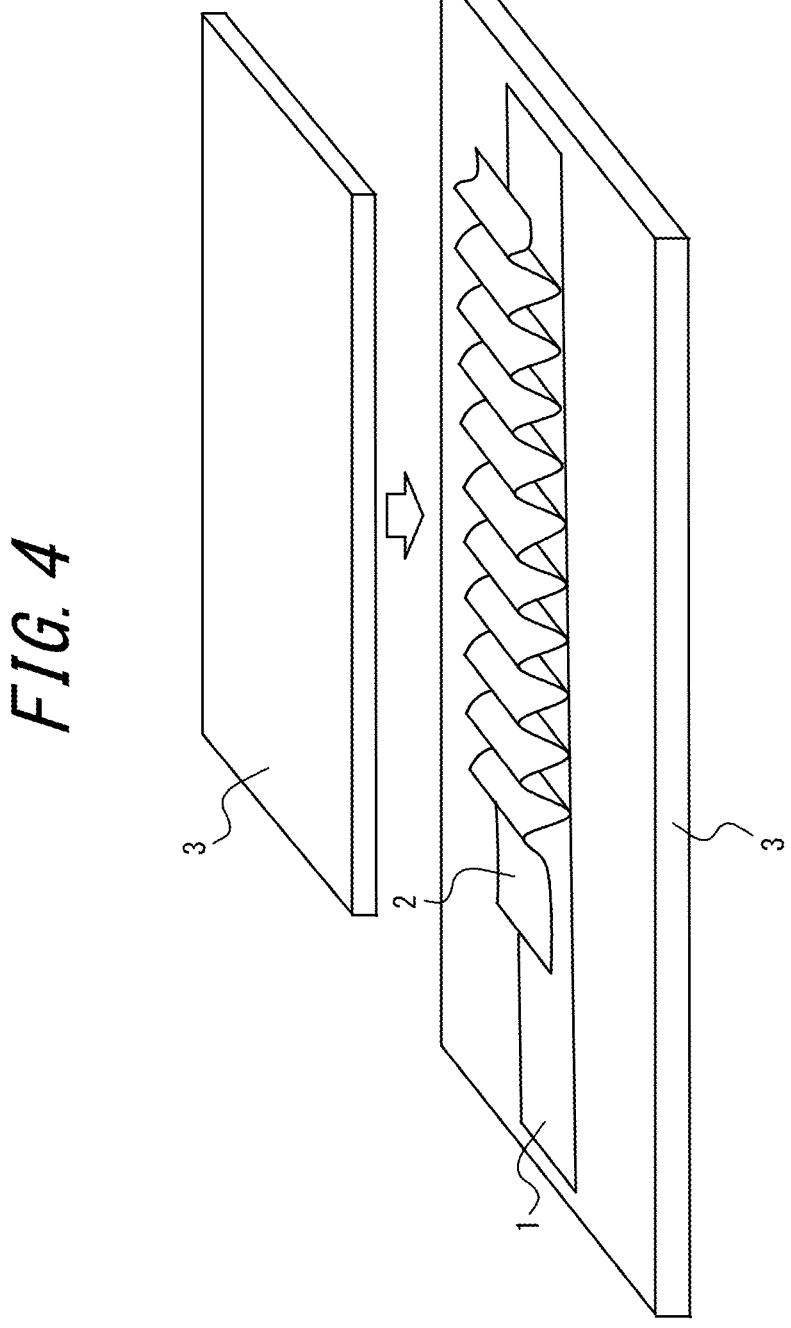
FIG. 4 is a schematic view illustrating how to prepare a test piece used for evaluation of diffusion bonding resistance.

Two test pieces each having a width of 7 mm and a length of 100 mm were collected from the stainless steel foil, and one of them was corrugated. In detail, the test piece was passed between two gear-type rolls with a minimum bending radius of 0.25 mm, a wave pitch of 3.0 mm, and a wave height of 3.0 mm to be corrugated, thus producing a corrugated foil. Here, the length of the corrugation process was adjusted so that there would be 10 vertices of the corrugated shape at which the corrugated foil and the flat foil were in contact with each other. After this, as illustrated in FIG. 4, a specimen was prepared by overlapping the corrugated foil and an unprocessed foil (flat foil) and placed on a ceramic plate made of zirconia, and further a weight of a ceramic plate made of zirconia with a mass of 32 g was placed on the specimen. In the drawing, reference numeral 3 is a ceramic plate. Next, in this state, the specimen was subjected to heat treatment (corresponding to heat treatment during brazing) of holding in a vacuum of $5.3 \times 10^{-3}$ Pa or less at 1150° C. for 30 minutes. Here, brazing material was not applied to the contact points between the corrugated foil and the flat foil. The corrugated foil and the flat foil of the specimen obtained as a result of the heat treatment were peeled off and the peeling load was measured using a universal tensile tester (AGS-1000B, load cell capacity: 1 kN) produced by Shimadzu Corporation. Here, the maximum peeling load was measured at each of the 10 contact points between the corrugated foil and the flat foil, and the average value of the 10 points was taken to be the peeling load. The diffusion bonding resistance was then evaluated based on the following criteria:

⊚ (pass, particularly excellent): peeling load<0.20 kgf

○ (pass): 0.20 kgf≤peeling load<0.40 kgf x (fail): 0.40 kgf≤peeling load.

(2) Brazeability

The brazing filler metal spreading test defined in JIS Z 3191 was conducted. The atmosphere in the brazing was a vacuum of $5.3 \times 10^{-3}$ Pa or less, and BNi-5 (Ni-20Cr-10Si) defined in JIS Z 3265 was used as the brazing material. In detail, a 50 mm square test piece was collected from the stainless steel foil, and 0.1 g of brazing material was applied to the test piece. The test piece was then inserted into a brazing furnace, and subjected to brazing heat treatment of heating at 1150° C. for 30 minutes and then performing furnace cooling. After this, the test piece was taken out of the brazing furnace, and the area of the brazing material portion (the spreading area of the brazing material) was measured. The same measurement was performed three times for each stainless steel foil, the average value of the area of the brazing material portion was calculated, and the brazeability was evaluated based on the following criteria:

○ (pass): average value of area of brazing material portion: 200 mm² or more x (fail): average value of area of brazing material portion: less than 200 mm².

(3) Oxidation Resistance

The stainless steel foil was subjected to heat treatment (corresponding to heat treatment during brazing) of holding at 1150° C. for 30 minutes in a vacuum of $5.3 \times 10^{-3}$ Pa or less. Three test pieces each having a width of 20 mm and a length of 30 mm were collected from the heat-treated stainless steel foil. These test pieces were subjected to heat treatment of holding at 1100° C. for 400 hours in an air atmosphere, and the average value of the mass gain by oxidation measured on the three test pieces was determined. The oxidation resistance was then evaluated based on the following criteria. The mass gain by oxidation is a value obtained by dividing the amount of change (increase) in mass (g) between before and after the heat treatment by the surface area (m²) of the test piece before the heat treatment.

⊚ (pass, excellent): average value of mass gain by oxidation: 10.0 g/m² or less

○ (pass): average value of mass gain by oxidation: more than 10.0 g/m² and 15.0 g/m² or less x (fail): average value of mass gain by oxidation: more than 15.0 g/m².

TABLE 1

| Steel | Chemical composition (mass %) | | | | | | | | | | | |
| ID | C | Si | Mn | P | S | Cr | Al | N | Ni | Ti, Zr, Hf, REM | Others | Remarks |
|---|---|---|---|---|---|---|---|---|---|---|---|---|
| A | 0.005 | 0.15 | 0.09 | 0.026 | 0.001 | 20.3 | 5.81 | 0.005 | 0.15 | Zr: 0.03, La: 0.08 | — | Conforming steel |
| B | 0.005 | 0.21 | 0.21 | 0.023 | 0.001 | 20.4 | 5.46 | 0.008 | 0.19 | Zr: 0.03, La: 0.09 | Cu: 0.03, V: 0.03 | Conforming steel |
| C | 0.015 | 0.13 | 0.12 | 0.022 | 0.002 | 17.9 | 3.42 | 0.009 | 0.21 | Ti: 0.15, Hf: 0.07 | — | Conforming steel |

TABLE 1-continued

| Steel ID | | | | | | | | | | | | |
|---|---|---|---|---|---|---|---|---|---|---|---|---|
| | C | Si | Mn | P | S | Cr | Al | N | Ni | Ti, Zr, Hf, REM | Others | Remarks |
| D | 0.012 | 0.31 | 0.19 | 0.031 | 0.001 | 20.6 | 6.31 | 0.008 | 0.16 | Zr: 0.04, Ce: 0.05, La: 0.02, Nd: 0.02 | — | Conforming steel |
| E | 0.006 | 0.16 | 0.15 | 0.025 | 0.001 | 20.1 | 5.76 | 0.006 | 0.14 | La: 0.08 | Mo: 3.1 | Conforming steel |
| F | 0.008 | 0.15 | 0.16 | 0.026 | 0.003 | 29.1 | 3.37 | 0.007 | 0.16 | Zr: 0.05, Hf: 0.09 | W: 1.2 | Conforming steel |
| G | 0.008 | 0.10 | 0.14 | 0.023 | 0.001 | 16.5 | 5.79 | 0.007 | 0.15 | Hf: 0.13 | Mo: 2.1, W: 2.2 | Conforming steel |
| H | 0.009 | 0.31 | 0.25 | 0.031 | 0.001 | 19.4 | 5.32 | 0.007 | 0.26 | La: 0.08 | Cu: 0.08, Ca: 0.0023, Mg: 0.0016 | Conforming steel |
| I | 0.006 | 0.12 | 0.11 | 0.022 | 0.001 | 18.2 | 3.41 | 0.008 | 0.18 | La: 0.12, Ti: 0.15 | — | Conforming steel |
| J | 0.004 | 0.40 | 0.16 | 0.026 | 0.001 | 20.7 | 3.61 | 0.006 | 0.21 | La: 0.09 | Nb: 0.21 | Conforming steel |
| K | 0.011 | 0.17 | 0.39 | 0.022 | 0.001 | 25.6 | 5.69 | 0.008 | 0.19 | La: 0.08, Zr: 0.03 | V: 0.08, B: 0.0021 | Conforming steel |
| L | 0.008 | 0.16 | 0.17 | 0.020 | 0.001 | 20.4 | 5.81 | 0.006 | 0.15 | Zr: 0.05 | Ca: 0.0045, Mg: 0.0021, Mo: 2.9 | Conforming steel |
| <u>M</u> | 0.003 | 0.21 | 0.21 | 0.035 | 0.001 | 20.1 | <u>1.62</u> | 0.005 | 0.15 | Zr: 0.04, La: 0.09 | — | Comparative steel |
| <u>N</u> | 0.009 | 0.41 | 0.23 | 0.029 | 0.001 | 20.4 | <u>7.14</u> | 0.009 | 0.16 | Zr: 0.03, La: 0.10 | — | Comparative steel |

Header for Chemical composition (mass %).

Note:
Underlines indicate outside the range according to the present disclosure.

TABLE 2

| No. | Steel ID | Final annealing | First immersion treatment (surface treatment) | | | | | Second immersion treatment (smut removal treatment) | | | Remarks |
|---|---|---|---|---|---|---|---|---|---|---|---|
| | | | Composition of treatment solution (mass %) | | | Treatment temperature (° C.) | Treatment time (sec) | Composition of treatment solution | Treatment temperature (° C.) | Treatment time (sec) | |
| | | | Hydrogen peroxide | Copper ion | Halide ion | | | | | | |
| 1 | A | Not performed | No surface treatment | | | | | — | — | — | Comparative Example |
| 2 | A | Not performed | Preliminary oxidation, no surface treatment | | | | | — | — | — | Comparative Example |
| 3 | A | Not performed | High-roughness roll rolling, no surface treatment | | | | | — | — | — | Comparative Example |
| 4 | A | Not performed | 0.2 | 1.5 | 10 | 30 | 30 | 30 mass % nitric acid aqueous solution | 50 | 60 | Example |
| 5 | A | Not performed | 0.2 | 1.5 | 10 | 40 | 60 | 30 mass % nitric acid aqueous solution | 50 | 60 | Example |
| 6 | A | Not performed | 0.2 | 9.0 | 10 | 40 | 60 | 30 mass % nitric acid aqueous solution | 50 | 60 | Example |
| 7 | A | Not performed | 2.0 | 1.5 | 10 | 40 | 60 | 30 mass % nitric acid aqueous solution | 50 | 60 | Example |
| 8 | A | Not performed | 0.2 | 1.5 | — | 40 | 60 | 30 mass % nitric acid aqueous solution | 50 | 60 | Comparative Example |
| 9 | A | Not performed | 0.2 | — | 10 | 40 | 60 | 30 mass % nitric acid aqueous solution | 50 | 60 | Comparative Example |
| 10 | B | Not performed | No surface treatment | | | | | — | — | — | Comparative Example |
| 11 | B | Not performed | Preliminary oxidation, no surface treatment | | | | | — | — | — | Comparative Example |
| 12 | B | Not performed | High-roughness roll rolling, no surface treatment | | | | | — | — | — | Comparative Example |

TABLE 2-continued

| | | | First immersion treatment (surface treatment) | | | | | Second immersion treatment (smut removal treatment) | | | |
| | | | Composition of treatment solution (mass %) | | | Treatment | Treatment | Composition of | Treatment | Treatment | |
| No. | Steel ID | Final annealing | Hydrogen peroxide | Copper ion | Halide ion | temperature (° C.) | time (sec) | treatment solution | temperature (° C.) | time (sec) | Remarks |
|---|---|---|---|---|---|---|---|---|---|---|---|
| 13 | B | Not performed | 0.2 | 1.5 | 10 | 30 | 30 | 30 mass % nitric acid aqueous solution | 50 | 60 | Example |
| 14 | B | Not performed | 0.2 | 1.5 | 10 | 40 | 60 | 30 mass % nitric acid aqueous solution | 50 | 60 | Example |
| 15 | B | Not performed | 0.2 | 9.0 | 10 | 40 | 60 | 30 mass % nitric acid aqueous solution | 50 | 60 | Example |
| 16 | B | Not performed | 2.0 | 1.5 | 10 | 40 | 60 | 30 mass % nitric acid aqueous solution | 50 | 60 | Example |
| 17 | B | Not performed | 0.2 | 1.5 | — | 40 | 60 | 30 mass % nitric acid aqueous solution | 50 | 60 | Comparative Example |
| 18 | B | Not performed | 0.2 | — | 10 | 40 | 60 | 30 mass % nitric acid aqueous solution | 50 | 60 | Comparative Example |
| 19 | C | Not performed | 0.2 | 1.5 | 10 | 40 | 60 | 30 mass % nitric acid aqueous solution | 50 | 60 | Example |
| 20 | D | Not performed | 0.2 | 1.5 | 10 | 40 | 60 | 30 mass % nitric acid aqueous solution | 30 | 30 | Example |
| 21 | E | Performed | 0.2 | 1.5 | 10 | 40 | 60 | 5 mass % sulfuric acid, 2.0 mass % hydrogen peroxide aqueous solution | 30 | 30 | Example |
| 22 | F | Performed | 0.2 | 1.5 | 10 | 40 | 60 | 5 mass % sulfuric acid, 2.0 mass % hydrogen peroxide, 1 mass % n-propanol aqueous solution | 30 | 30 | Example |
| 23 | G | Performed | 0.2 | 1.5 | 15 | 40 | 60 | 30 mass % nitric acid aqueous solution | 50 | 30 | Example |
| 24 | H | Not performed | 2.0 | 1.5 | 10 | 40 | 60 | 30 mass % nitric acid aqueous solution | 50 | 10 | Example |
| 25 | I | Not performed | 0.2 | 1.5 | 10 | 40 | 60 | 10 mass % nitric acid aqueous solution | 50 | 60 | Example |
| 26 | J | Not performed | 0.2 | 9.0 | 10 | 40 | 60 | 5 mass % nitric acid aqueous solution | 30 | 60 | Example |
| 27 | K | Not performed | 0.2 | 1.5 | 10 | 40 | 60 | 5 mass % nitric acid aqueous solution | 50 | 60 | Example |
| 28 | L | Not performed | 0.2 | 1.5 | 10 | 40 | 60 | 5 mass % nitric acid aqueous solution | 50 | 60 | Example |
| 29 | M | Not performed | 0.2 | 1.5 | 10 | 40 | 60 | 30 mass % nitric acid aqueous solution | 50 | 60 | Comparative Example |
| 30 | N | | | | | Not evaluated because cracking occurred in hot rolling | | | | | Comparative Example |

Note:
Underlines indicate outside the range according to the present disclosure.

TABLE 3

| No. | Steel ID | Sa (μm) | Str | (1) Diffusion bonding resistance | | (2) Brazeability | | (3) Oxidation resistance | | Remarks |
|---|---|---|---|---|---|---|---|---|---|---|
| | | | | Peeling strength (kgf) | Evaluation | Brazing material portion area (mm²) | Evaluation | Mass gain by oxidation (g/m²) | Evaluation | |
| 1 | A | 0.18 | 0.05 | 0.78 | X | 251 | ○ | 8.9 | ◎ | Comparative Example |
| 2 | A | 0.21 | 0.09 | 0.35 | ○ | 153 | X | 7.5 | ◎ | Comparative Example |
| 3 | A | 0.56 | 0.06 | 0.58 | X | 297 | ○ | 7.9 | ◎ | Comparative Example |
| 4 | A | 1.31 | 0.25 | 0.28 | ○ | 310 | ○ | 8.1 | ◎ | Example |
| 5 | A | 1.83 | 0.53 | 0.18 | ◎ | 384 | ○ | 8.5 | ◎ | Example |
| 6 | A | 2.31 | 0.69 | 0.08 | ◎ | 318 | ○ | 8.5 | ◎ | Example |
| 7 | A | 2.20 | 0.54 | 0.09 | ◎ | 284 | ○ | 8.9 | ◎ | Example |
| 8 | A | 0.19 | 0.07 | 0.71 | X | 291 | ○ | 9.1 | ◎ | Comparative Example |
| 9 | A | 0.75 | 0.11 | 0.49 | X | 285 | ○ | 8.6 | ◎ | Comparative Example |
| 10 | B | 0.23 | 0.04 | 0.81 | X | 251 | ○ | 8.5 | ◎ | Comparative Example |
| 11 | B | 0.25 | 0.08 | 0.32 | ○ | 171 | X | 7.9 | ◎ | Comparative Example |
| 12 | B | 0.54 | 0.04 | 0.51 | X | 251 | ○ | 8.5 | ◎ | Comparative Example |
| 13 | B | 1.12 | 0.24 | 0.28 | ○ | 350 | ○ | 7.6 | ◎ | Example |
| 14 | B | 1.75 | 0.43 | 0.17 | ◎ | 341 | ○ | 7.9 | ◎ | Example |
| 15 | B | 2.14 | 0.66 | 0.08 | ◎ | 313 | ○ | 7.8 | ◎ | Example |
| 16 | B | 2.25. | 0.59 | 0.08 | ◎ | 352 | ○ | 8.5 | ◎ | Example |
| 17 | B | 0.29 | 0.07 | 0.64 | X | 281 | ○ | 8.4 | ◎ | Comparative Example |
| 18 | B | 0.63 | 0.15 | 0.47 | X | 325 | ○ | 8.3 | ◎ | Comparative Example |
| 19 | C | 1.83 | 0.51 | 0.15 | ◎ | 381 | ○ | 13.1 | ○ | Example |
| 20 | D | 1.91 | 0.65 | 0.18 | ◎ | 329 | ○ | 12.1 | ○ | Example |
| 21 | E | 2.18 | 0.48 | 0.10 | ◎ | 298 | ○ | 9.1 | ◎ | Example |
| 22 | F | 2.29 | 0.59 | 0.09 | ◎ | 314 | ○ | 8.7 | ◎ | Example |
| 23 | G | 1.76 | 0.63 | 0.15 | ◎ | 297 | ○ | 11.2 | ○ | Example |
| 24 | H | 2.81 | 0.54 | 0.07 | ◎ | 319 | ○ | 13.2 | ○ | Example |
| 25 | I | 1.67 | 0.67 | 0.12 | ◎ | 225 | ○ | 12.3 | ○ | Example |
| 26 | J | 2.31 | 0.63 | 0.08 | ◎ | 317 | ○ | 11.5 | ○ | Example |
| 27 | K | 1.78 | 0.69 | 0.18 | ◎ | 329 | ○ | 12.3 | ○ | Example |
| 28 | L | 1.98 | 0.59 | 0.13 | ◎ | 296 | ○ | 11.5 | ○ | Example |
| 29 | M | 1.75 | 0.51 | 0.07 | ◎ | 531 | ○ | 51 | X | Comparative Example |
| 30 | N | Not evaluated because cracking occurred in hot rolling | | | | | | | | Comparative Example |

Note:
Underlines indicate outside the range according to the present disclosure.

As shown in Table 3, in each Example, superior diffusion bonding resistance and brazeability were both achieved, and also the oxidation resistance at high temperatures was superior.

In each Comparative Example, at least one of the diffusion bonding resistance, the brazeability, and the oxidation resistance was insufficient.

Example 2

For each of steel IDs A, B, E, and L in Table 1, a blank stainless steel foil of 50 μm in thickness was obtained under the same conditions as in Example 1. Some blank stainless steel foils were each further subjected to, after the cold rolling, final annealing under the conditions shown in Table 4 in a mixed atmosphere of $H_2$ and $N_2$ ($H_2:N_2=75:25$ in volume ratio, dew point: –50° C.).

Each blank stainless steel foil was then subjected to first immersion treatment (surface treatment) and second immersion treatment (smut removal treatment) under the conditions shown in Table 4, to obtain a stainless steel foil as a finished product. After the second immersion treatment, the stainless steel foil was immersed in pure water to stop the reaction.

The thickness of each stainless steel foil thus obtained was measured with a micrometer. Moreover, Sa and Str were measured in the same manner as in Example 1. Further, the average grain size was measured in the above-described manner. The measurement results are shown in Table 5. "Unmeasurable" in the grain size field in Table 5 means that grain boundaries were not observed in electron backscatter diffraction (EBSD) analysis and the average grain size could not be measured. The chemical composition of each stainless steel foil finally obtained was substantially the same as the chemical composition of the steel ID listed in Table 1, and satisfied the range of the chemical composition of the stainless steel foil according to one embodiment of the present disclosure.

Moreover, for each stainless steel foil, (1) diffusion bonding resistance, (2) brazeability, and (3) oxidation resistance were evaluated by the same methods as in Example 1. The evaluation results are shown in Table 5.

TABLE 4

| No. | Steel ID | First immersion treatment (surface treatment) | | | | | | | Second immersion treatment (smut removal treatment) | | | Remarks |
| | | Final annealing | | Composition of treatment solution (mass %) | | | Treatment temperature (° C.) | Treatment time (sec) | | Treatment temperature (° C.) | Treatment time (sec) | |
| | | Temperature (° C.) | Time (sec) | Hydrogen peroxide | Copper ion | Halide ion | | | Composition of treatment solution | | | |
| 2-1 | A | Not performed | | 0.2 | 1.5 | 10 | 30 | 30 | 30 mass % nitric acid aqueous solution | 50 | 60 | Example |
| 2-2 | A | Not performed | | 0.2 | 1.5 | 10 | 40 | 60 | 30 mass % nitric acid aqueous solution | 50 | 60 | Example |
| 2-3 | A | 800 | 30 | 0.2 | 1.5 | 10 | 30 | 30 | 30 mass % nitric acid aqueous solution | 50 | 60 | Example |
| 2-4 | A | 900 | 30 | 0.2 | 1.5 | 10 | 30 | 30 | 30 mass % nitric acid aqueous solution | 50 | 60 | Example |
| 2-5 | A | 950 | 30 | 0.2 | 1.5 | 10 | 30 | 30 | 30 mass % nitric acid aqueous solution | 50 | 60 | Example |
| 2-6 | A | 1000 | 30 | 0.2 | 1.5 | 10 | 30 | 30 | 30 mass % nitric acid aqueous solution | 50 | 60 | Example |
| 2-7 | B | Not performed | | 0.2 | 1.5 | 10 | 30 | 30 | 30 mass % nitric acid aqueous solution | 50 | 60 | Example |
| 2-8 | B | Not performed | | 0.2 | 1.5 | 10 | 40 | 60 | 30 mass % nitric acid aqueous solution | 50 | 60 | Example |
| 2-9 | B | 800 | 30 | 0.2 | 1.5 | 10 | 30 | 30 | 30 mass % nitric acid aqueous solution | 50 | 60 | Example |
| 2-10 | B | 900 | 30 | 0.2 | 1.5 | 10 | 30 | 30 | 30 mass % nitric acid aqueous solution | 50 | 60 | Example |
| 2-11 | B | 950 | 30 | 0.2 | 1.5 | 10 | 30 | 30 | 30 mass % nitric acid aqueous solution | 50 | 60 | Example |
| 2-12 | B | 1000 | 30 | 0.2 | 1.5 | 10 | 30 | 30 | 30 mass % nitric acid aqueous solution | 50 | 60 | Example |
| 2-13 | E | Not performed | | 0.2 | 1.5 | 10 | 30 | 30 | 30 mass % nitric acid aqueous solution | 50 | 60 | Example |
| 2-14 | E | 950 | 30 | 0.2 | 1.5 | 10 | 30 | 30 | 30 mass % nitric acid aqueous solution | 50 | 60 | Example |
| 2-15 | L | Not performed | | 0.2 | 1.5 | 10 | 30 | 30 | 5 mass % nitric acid aqueous solution | 50 | 60 | Example |
| 2-16 | L | Not performed | | 0.2 | 1.5 | 10 | 40 | 60 | 5 mass % nitric acid aqueous solution | 50 | 60 | Example |
| 2-17 | L | 950 | 30 | 0.2 | 1.5 | 10 | 30 | 30 | 5 mass % nitric acid aqueous solution | 50 | 60 | Example |

Note:
Underlines indicate outside the range according to the present disclosure.

TABLE 5

| No. | Steel ID | Sa (μm) | Str | Grain size (μm) | Thickness (μm) | (1) Diffusion bonding resistance | | (2) Brazeability | | (3) Oxidation resistance | | Remarks |
|---|---|---|---|---|---|---|---|---|---|---|---|---|
| | | | | | | Peeling strength (kgf) | Evaluation | Brazing material portion area (mm²) | Evaluation | Mass gain by oxidation (g/m²) | Evaluation | |
| 2-1 | A | 1.31 | 0.25 | Unmeasurable | 48 | 0.28 | ○ | 310 | ○ | 8.1 | ◎ | Example |
| 2-2 | A | 1.83 | 0.53 | Unmeasurable | 29 | 0.18 | ◎ | 384 | ○ | 8.5 | ◎ | Example |
| 2-3 | A | 1.45 | 0.37 | 11 | 47 | 0.33 | ○ | 301 | ○ | 7.5 | ◎ | Example |
| 2-4 | A | 2.15 | 0.69 | 15 | 47 | 0.09 | ◎ | 315 | ○ | 7.4 | ◎ | Example |
| 2-5 | A | 2.38 | 0.82 | 23 | 48 | 0.08 | ◎ | 306 | ○ | 7.5 | ◎ | Example |
| 2-6 | A | 1.32 | 0.28 | 29 | 46 | 0.28 | ○ | 320 | ○ | 7.6 | ◎ | Example |
| 2-7 | B | 1.12 | 0.24 | Unmeasurable | 46 | 0.28 | ○ | 350 | ○ | 7.6 | ◎ | Example |
| 2-8 | B | 1.75 | 0.43 | Unmeasurable | 27 | 0.17 | ◎ | 341 | ○ | 7.9 | ◎ | Example |
| 2-9 | B | 1.35 | 0.31 | 10 | 46 | 0.26 | ○ | 295 | ○ | 7.4 | ◎ | Example |
| 2-10 | B | 2.25 | 0.65 | 18 | 47 | 0.11 | ◎ | 313 | ○ | 7.2 | ◎ | Example |
| 2-11 | B | 2.53 | 0.69 | 22 | 47 | 0.08 | ◎ | 302 | ○ | 7.2 | ◎ | Example |
| 2-12 | B | 1.23 | 0.33 | 31 | 48 | 0.33 | ○ | 285 | ○ | 7.5 | ◎ | Example |
| 2-13 | E | 1.25 | 0.33 | Unmeasurable | 47 | 0.29 | ○ | 330 | ○ | 8.9 | ◎ | Example |
| 2-14 | E | 2.46 | 0.72 | 23 | 46 | 0.09 | ◎ | 286 | ○ | 7.8 | ◎ | Example |
| 2-15 | L | 1.15 | 0.23 | Unmeasurable | 47 | 0.35 | ○ | 346 | ○ | 10.8 | ○ | Example |
| 2-16 | L | 1.98 | 0.59 | Unmeasurable | 26 | 0.13 | ◎ | 296 | ○ | 11.5 | ○ | Example |
| 2-17 | L | 2.43 | 0.65 | 22 | 46 | 0.09 | ◎ | 286 | ○ | 8.7 | ◎ | Example |

Note:
Underlines indicate outside the range according to the present disclosure.

As shown in Table 5, in each Example, superior diffusion bonding resistance and brazeability were both achieved, and the oxidation resistance at high temperatures was superior.

In particular, in each of Examples No. 2-4, 2-5, 2-10, 2-11, 2-14, and 2-17 having an average grain size of 15 μm or more and 25 μm or less, while reducing the dissolution amount of the stainless steel foil in the first immersion treatment (ensuring 45 μm or more of the thickness of the stainless steel foil as the finished product, i.e. limiting the reduction in the thickness of the stainless steel foil to 5 μm or less), particularly superior diffusion bonding resistance and brazeability were both achieved, and also the oxidation resistance at high temperatures was superior.

REFERENCE SIGNS LIST 1 flat foil
2 corrugated foil
3 ceramic plate

The invention claimed is:

1. A stainless steel foil for a catalyst support of an exhaust gas purifier, comprising:
a chemical composition containing, in mass %,
C: 0.020% or less,
Si: 1.0% or less,
Mn: 1.0% or less,
P: 0.040% or less,
S: 0.004% or less,
Cr: 16.0% to 30.0%,
Al: 2.00 to 6.50%,
N: 0.020% or less,
Ni: 0.50% or less, and
at least one selected from the group consisting of
Ti: 0.30% or less,
Zr: 0.20% or less,
Hf: 0.20% or less, and
REM: 0.20% or less,
with a balance consisting of Fe and inevitable impurities;
a parameter Sa defined in ISO 25178 of 0.50 μm to 3.00 μm; and
a parameter Str defined in ISO 25178 of 0.20 to 1.00.

2. The stainless steel foil for a catalyst support of an exhaust gas purifier according to claim 1, wherein the chemical composition further contains, in mass %, at least one selected from the group consisting of
Cu: 0.10% or less,
Nb: 0.30% or less,
V: 0.30% or less,
Ca: 0.0100% or less,
Mg: 0.0100% or less, and
B: 0.0050% or less.

3. The stainless steel foil for a catalyst support of an exhaust gas purifier according to claim 1, wherein the chemical composition further contains at least one selected from the group consisting of Mo and W, and
a total content of Mo and W is 6.0 mass % or less.

4. The stainless steel foil for a catalyst support of an exhaust gas purifier according to claim 1, comprising
an average grain size of 15 μm or more and 25 μm or less.

5. The stainless steel foil for a catalyst support of an exhaust gas purifier according to claim 2, wherein the chemical composition further contains at least one selected from the group consisting of Mo and W, and
a total content of Mo and W is 6.0 mass % or less.

6. The stainless steel foil for a catalyst support of an exhaust gas purifier according to claim 2, comprising
an average grain size of 15 μm or more and 25 μm or less.

7. The stainless steel foil for a catalyst support of an exhaust gas purifier according to claim 3, comprising
an average grain size of 15 μm or more and 25 μm or less.

8. The stainless steel foil for a catalyst support of an exhaust gas purifier according to claim 5, comprising
an average grain size of 15 μm or more and 25 μm or less.

9. The stainless steel foil for a catalyst support of an exhaust gas purifier according to claim 1, wherein the parameter Sa defined in ISO 25178 is 1.75 μm to 3.00 μm.

* * * * *